United States Patent
Zhu et al.

(10) Patent No.: US 10,007,264 B2
(45) Date of Patent: Jun. 26, 2018

(54) AUTONOMOUS VEHICLE HUMAN DRIVER TAKEOVER MECHANISM USING ELECTRODES

(71) Applicant: Baidu USA LLC, Sunnyvale, CA (US)

(72) Inventors: Fan Zhu, Sunnyvale, CA (US); Qi Kong, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days. days.

(21) Appl. No.: 15/210,764

(22) Filed: Jul. 14, 2016

(65) Prior Publication Data

US 2018/0017968 A1    Jan. 18, 2018

(51) Int. Cl.
*G05D 1/00* (2006.01)
*B60W 50/08* (2012.01)
*B60W 50/00* (2006.01)

(52) U.S. Cl.
CPC .......... *G05D 1/0061* (2013.01); *B60W 50/08* (2013.01); *B60W 2050/0095* (2013.01); *B60W 2540/04* (2013.01)

(58) Field of Classification Search
CPC ................ G05D 1/0061; B60W 50/08; B60W 2050/0095; B60W 2540/04
See application file for complete search history.

(56) References Cited

U.S. PATENT DOCUMENTS

| 8,352,110 | B1 | 1/2013 | Szybalski et al. |
| 8,818,608 | B2 | 8/2014 | Cullinane et al. |
| 9,616,896 | B1* | 4/2017 | Letwin ............... B60W 30/182 |
| 2007/0198145 | A1 | 8/2007 | Norris et al. |
| 2011/0245643 | A1* | 10/2011 | Lisseman ................ A61B 5/01 600/372 |
| 2012/0035788 | A1 | 2/2012 | Trepagnier et al. |
| 2013/0131906 | A1 | 5/2013 | Green et al. |
| 2016/0001781 | A1 | 1/2016 | Fung et al. |

* cited by examiner

*Primary Examiner* — Anne M Antonucci
(74) *Attorney, Agent, or Firm* — Womble Bond Dickinson (US) LLP (57) ABSTRACT

In one embodiment, an autonomous vehicle is operated in an autonomous mode, where during the autonomous mode, the autonomous vehicle operates without influence of a human driver riding the autonomous vehicle. An electrical current is detected flowing through a first electrode and a second electrode mounted on a steering wheel of the autonomous vehicle. In response to the detecting the electrical current flowing through the first and second electrodes, the autonomous vehicle is transitioned from the autonomous mode to a manual mode. Thereafter, the autonomous vehicle is operated in the manual mode in response to user actions from the human driver.

21 Claims, 5 Drawing Sheets

AUTONOMOUS VEHICLE HUMAN DRIVER TAKEOVER MECHANISM USING ELECTRODES

FIELD OF THE INVENTION

Embodiments of the present invention relate generally to operating autonomous vehicles. More particularly, embodiments of the invention relate to a mechanism to take over control of an autonomous vehicle by a human driver.

BACKGROUND

Autonomous vehicles typically can operate in a manual mode or an autonomous mode. Vehicles operating in a manual mode respond to drivers' input. When operating in an autonomous mode, a vehicle can navigate to various locations using onboard sensors, allowing the vehicle to travel with minimal human interaction or in some cases without any passengers. Vehicles operating in an autonomous mode (e.g., driverless) can relieve occupants, especially the driver, from some driving-related responsibilities.

In some situations, a driver may want to take over the control of the vehicle, especially in an emergency situation. It is essential to have a quick human takeover mechanism that releases the control from the autonomous driving system to a human driver during the autonomous driving of autonomous vehicles. However, there is no sophisticated mechanism that allows a driver to take over the control of a vehicle smoothly.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, an electrode-based mechanism is utilized to allow a human driver to take over the control of an autonomous vehicle once the driver touches a steering wheel. This takeover mechanism is smooth and nature as this may be a natural reaction for a human driver to take over the control, for example, by grabbing the steering wheel, in response to an emergency situation. Most importantly, this does not requires an extra operation of the driver making it optimal in responding time.

In one embodiment, at least a pair of electrodes is mounted on a steering wheel of an autonomous vehicle. The electrodes are coupled to a detection circuit, which when a human driver contacts the electrodes, for example, by grabbing the electrodes by hands, an electrical current is generated flowing through a human body of the driver and the electrodes. The electrical current is detected by the detection circuit. In response to the electrical current, the vehicle transitions from an autonomous driving mode to a manual driving mode. During a manual driving mode, the vehicle operates in response to the driver's commands or inputs (e.g., manual acceleration, deceleration, turning, braking, etc.) The electrodes may be mounted on the steering wheel at different locations without physically touching. The mounting locations may be the locations on the steering wheel that a typical human driver more likely grabs when the driver wishes to take over the control, especially during an emergency situation.

Figure 1:
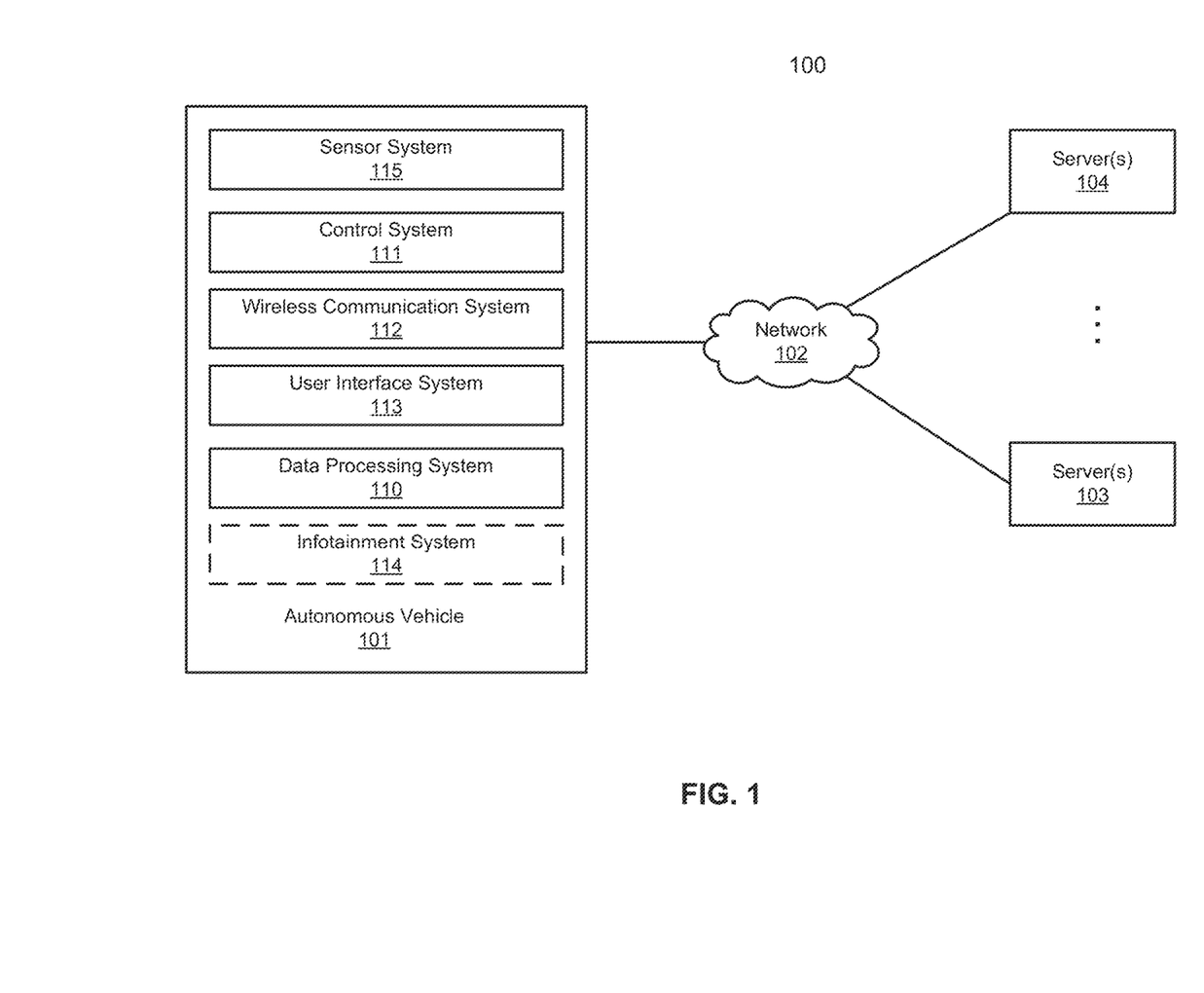
FIG. 1 is a block diagram illustrating a networked system according to one embodiment of the invention.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (POI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, data processing system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or data processing system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
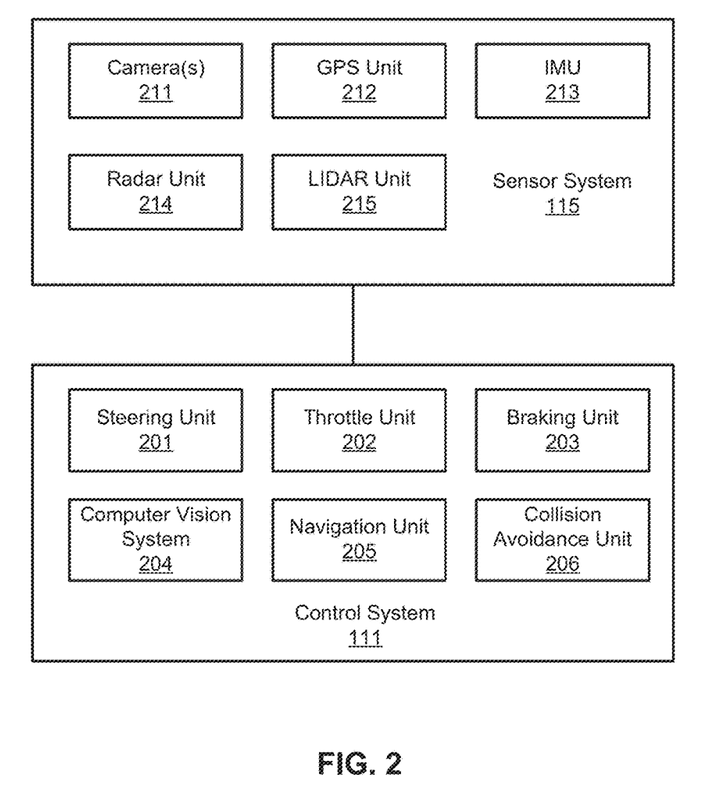
FIG. 2 is a block diagram illustrating an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), braking unit 203, computer vision system 204, navigation unit 205 (also referred to as a navigation and pathing or navigation/pathing system), and collision avoidance unit 206 (also referred to as an obstacle avoidance system). Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle.

Computer vision unit or system 204 is to process and analyze images captured by one or more cameras 211 in order to identify objects and/or features in the environment of autonomous vehicle. The objects can include traffic signals, road way boundaries, other vehicles, pedestrians, and/or obstacles, etc. Computer vision system 204 may use an object recognition algorithm, video tracking, and other computer vision techniques. In some embodiments, computer vision system 204 can map an environment, track objects, and estimate the speed of objects, etc.

Navigation unit or system 205 is to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via a user interface. Navigation system 205 may update the driving path dynamically while the autonomous vehicle is in operation. Navigation system 205 can incorporate data from a GPS system and one or more maps so as to determine the driving path for the autonomous vehicle.

Collision avoidance unit or system 206 is to identify, evaluate, and avoid or otherwise negotiate potential obstacles in the environment of the autonomous vehicle. For example, collision avoidance system 206 may effect changes in the navigation of the autonomous vehicle by operating one or more subsystems in the control system to undertake swerving maneuvers, turning maneuvers, braking maneuvers, etc. Collision avoidance system 206 may automatically determine feasible obstacle avoidance maneuvers on the basis of surrounding traffic patterns, road conditions, etc. Collision avoidance system 206 may be configured such that a swerving maneuver is not undertaken when other sensor systems detect vehicles, construction barriers, etc. in the region adjacent the autonomous vehicle that would be swerved into. Collision avoidance system 206 may automatically select the maneuver that is both available and maximizes safety of occupants of the autonomous vehicle. Collision avoidance system 206 may select an avoidance maneuver predicted to cause the least amount of acceleration in a passenger cabin of the autonomous vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some of all of the functions of autonomous vehicle 101 may be controlled or managed by data processing system 110, especially when operating in an autonomous driving mode. Data processing system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, data processing system 110 may be integrated with vehicle control system 111.

For example, a user as a passenger may specify a starting location and a destination of a trip, for example, via a user interface. Data processing system 110 communicates with other components of autonomous vehicle 101 to obtain the trip related data. For example, data processing system 110 may obtain location and route information from a location server and a map and POI (MPOI) server, which may be a part of servers 103-104. The location server provides location services and MPOI server 105 provides map services and the POIs of certain locations. Alternatively, such location and MPOI information may be cached locally in a persistent storage device of data processing system 110.

During traveling of autonomous vehicle 101 along the route, data processing system 110 may also obtain real-time traffic information from a traffic information system or server (TIS). Note that servers 103-104 may be operated by a third party entity. Alternatively, the functionalities of servers 103-104 may be integrated with data processing system 110. Based on the real-time traffic information, MPOI information, and location information, as well as real-time local environment data detected or sensed by sensor system 115 (e.g., obstacles, objects, nearby vehicles), data processing system 110 can plan an optimal route and drive vehicle 101, for example, via control system 111, according to the planned route to reach the specified destination safely and efficiently.

According to one embodiment, autonomous vehicle 101 further includes infotainment system 114 to provide information and entertainment to passengers of vehicle 101. The information and entertainment content may be received, compiled, and rendered based on content information stored locally and/or remotely (e.g., provided by servers 103-104). For example, the information may be streamed in real-time from any of servers 103-104 over network 102 and displayed on a display device of vehicle 101. The information may be augmented with local information captured in real-time, for example, by one or more cameras and the augmented content can then be displayed in a virtual reality manner.

In an autonomous vehicle, there may be no actual or physical window. Rather, a "window" (referred to herein as a virtual window) may be represented or replaced by a display device, i.e., a flat or curved screen display device molded into a shape of a vehicle window, optionally with a touch screen. The display device would display images or stream of images (e.g., video) that are captured dynamically in real-time by an appropriate camera or cameras, as if the user were watching or viewing the actual physical content through a see-through window. For each of the "windows" (e.g., display devices), there is a corresponding display channel to stream the corresponding content to be displayed at real-time, which may be centrally processed by an augmenting reality system, e.g., infotainment system 114 and/or data processing system 110. In such situation, an augmented image is displayed in a virtual reality manner via infotainment system 114, also referred to as an augmented reality manner.

For example, a content item received from a content database or from a remote content provider or content server may be superimposed onto an image captured locally by a camera to become an augmented image. The augmented image is then displayed on a display device within autonomous vehicle 101. The display device may be configured to appear as an ordinary window of a vehicle. When a user looks at the display device, the object of the image is displayed as a virtual object in a virtual reality manner as if the user looked at the physical object through an ordinary window of the vehicle. The display device may display a stream of augmented images (e.g., augmented video) in real time, which is similar or simulates an augmented reality (AR) environment.

In one embodiment, based on location and route information, MPOI information, and/or real-time traffic information, infotainment system 114 and/or data processing system 110 determines certain types of content that are suitable for the current traffic environment (e.g., MPOIs). The system performs a lookup operation in a content index (not shown) to identify a list content items (e.g., sponsored content or Ads) as content item candidates, for example, based on the real-time traveling information.

In one embodiment, the system ranks the content items in the list using a variety of ranking algorithm. The content items may be ranked based on a user profile of the user. For example, the content items may be ranked based on user preferences, which may be derived from the user profile. The user profile may be compiled based on a history of user operations of the user in the past. In one embodiment, the system applies one or more content ranking models to each of the content items to determine a ranking score for each content item. A content item having a ranking score that is above a predetermined threshold may be selected. The content ranking models may be trained using sets of known features representing similar traveling environments or traffic conditions in the past. The content ranking models may also be trained based on user profiles of similar users.

The selected content item is then rendered and displayed on a display device within the autonomous vehicle. In one embodiment, the system further augments the selected content item onto an image that is captured at the point in time using one or more cameras of the autonomous vehicle. In one embodiment, an image recognition is performed on the image and to derive or understanding the content represented by the image. For example, one or more keywords may be derived to describe the image or a POI. The list of content items may be identified further based on the one or more keywords or the POI represented by the image. The system then augments the selected content item onto the image generate an augmented image, where the content item may be superimposed on the image. The augmented image is then displayed on a display device of the autonomous vehicle. Note that infotainment system 114 may be integrated with data processing system 110 according to some embodiments.

Alternatively, a user can specifically select from a list of precompiled content (e.g., videos, movies) from a content store or database, which may be periodically updated from a content server of a content provider over a network (e.g., cloud network). Thus, a user can specifically select the real-time actual content captured in real-time or previously rendered content to be displayed on the display device(s), for example, retrieved from data store 125. For example, if autonomous vehicle 101 is traveling in a snowy day in New York City, the user can switch the display devices to display a sunny environment in Hawaii as if autonomous vehicle 101 was traveling on a sunny day. The content may displayed in multiple display devices (e.g., multiple windows) in a collaborated or coordinated manner, i.e., virtual reality manner.

According to one embodiment, a sensing or switching mechanism is mounted on a steering wheel of vehicle 101 to detect a contact of a human driver with the steering wheel. The sensing mechanism may include one or more sensors to detect that a human driver has contacted a predetermined location of the steering wheel, which may be interpreted as a signal or request from the driver to take over the control of vehicle 101. The sensing mechanism may include one or more pressure sensors or buttons operating as a mechanism switch, one or more electrical sensors operating as an electrical switch, or a combination thereof. In one embodiment, a pair of electrodes may be mounted on a couple of predetermined locations of the steering wheel. When a human driver grabs the predetermined locations of the steering wheel by hands, an electrical current is generated through a body part of the human body and the electrodes. The electrical current is detected and interpreted as a signal or request from the driver to take over the control of vehicle 101. In response to such as signal or request, vehicle 101 transitions from an autonomous driving mode to a manual driving mode, and vehicle 101 operates in response to driver's inputs thereafter.

Figure 3:
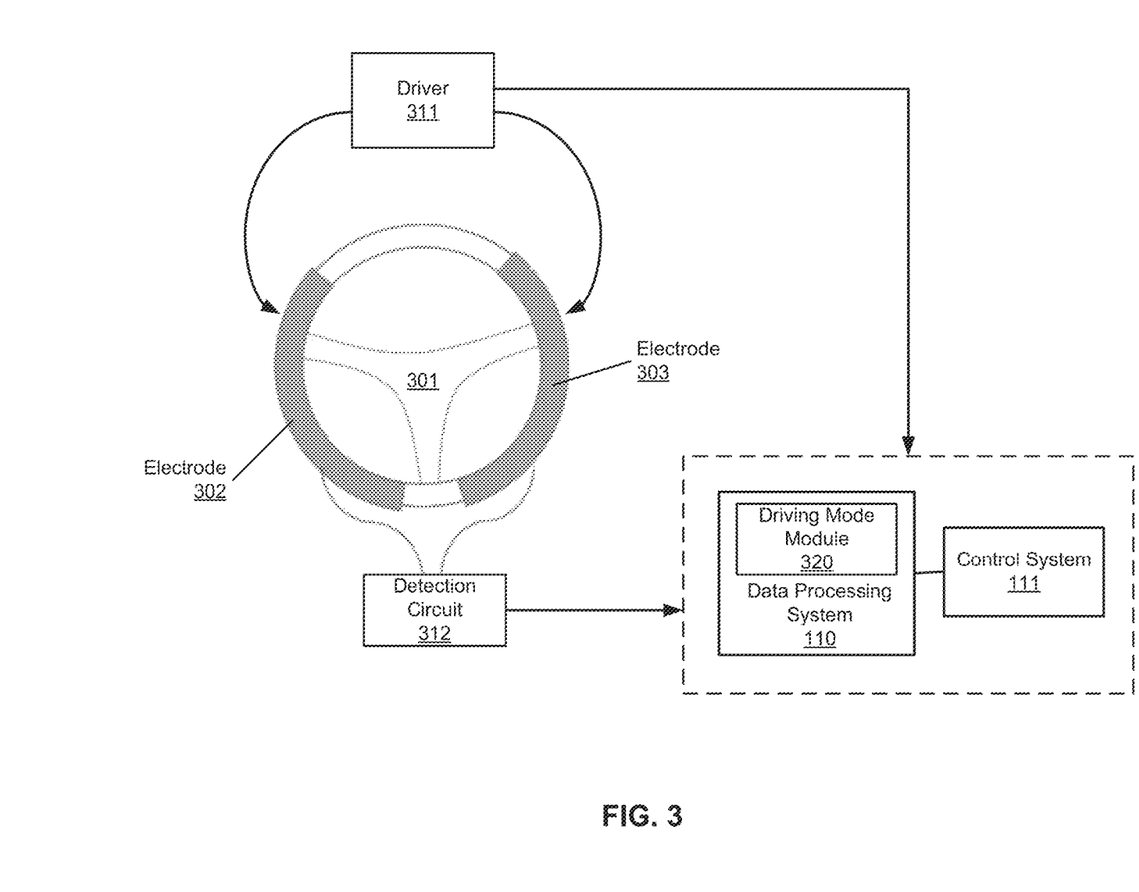
FIG. 3 is a block diagram illustrating an autonomous vehicle according to another embodiment of the invention.

FIG. 3 is a block diagram illustrating an autonomous vehicle according to another embodiment of the invention. Vehicle 300 may be implemented as vehicle 101 of FIG. 1. Referring to FIG. 3, steering wheel 301 of vehicle 300 includes a pair of electrodes 302-303 mounted on different locations of steering wheel 301. Electrodes 302-303 may be mounted on at least two locations of steering wheel 301 that a driver likely grabs, especially during an emergency situation. In one embodiment, electrode 302 is mounted on a first location as part of a first half of steering wheel 301, while electrode 303 is mounted on a second location as part of a second half of steering wheel 301, as indicated in shady or gray areas on steering wheel 301. In a further embodiment, electrode 302 covers most of the first half of steering wheel 301, while electrode 303 covers most of the second half of steering wheel 301, such that driver 111 most likely contact both electrodes 302-303 when grabbing steering wheel 301.

When driver 311 contacts steering wheel 301, a first body part and second body part of driver 311 (e.g., hands) most likely contact electrodes 302-303, respectively. As a result, an electrically conductive loop is formed, i.e., from electrode 302, the body of driver 311, electrode 303, and to detection circuit 312. Once the loop is formed, an electrical current is generated flowing through the loop and detected by detection circuit 312. In response to the detection of the electrical current, detection circuit 312 sends a signal or interrupt to data processing system 110 and/or vehicle control system 111 indicating that driver 311 would like to take over the control of vehicle 300. In response to the signal, data processing system 110 and/or vehicle control system 111 transitions vehicle 300 from an autonomous mode to a manual mode to allow driver 311 controls vehicle 300. In one embodiment, detection circuit 312 sends a signal or an interrupt to driving mode module 320 implemented within data processing system 110 to indicate that driver 311 wishes to take over the control of vehicle 300. In response, driving mode module 320 performs the necessary operations and/or communicates with vehicle control system 111 to transition vehicle 300 from an autonomous mode to a manual mode.

It is advantageous to implement a takeover detection mechanism on a steering wheel of a vehicle. The rationale behind it is that when a driver wishes to take over the control of the vehicle, the most likely driver's first reaction is to grab and hold onto the steering wheel. This is especially true when the driver encounters an emergency situation. It is not convenient for a driver to look for a particular button or switch mounted somewhere else to switch the vehicle from an autonomous driving mode to a manual driving mode in response to an emergency event.

In one embodiment, vehicle 300 may transition from an autonomous driving mode to a manual driving mode after a predetermined period of time during which the driver contacts electrodes 302-303. This can reduce the chances of false alarms that driver 311 may accidentally contact electrodes 302-303. In another embodiment, in order to reduce the possibility of false alarms, the detection of an electrical current flowing through electrodes 302-303 may be combined with one or more other driver actions to confirm the takeover intent of the driver. For example, the driver action of grabbing steering wheel 301 in combination of stepping on the brake of vehicle 300, stepping on the acceleration pedal, and/or turning steering wheel 301 can be utilized to confirm the intent of driver 311 to take over the control of vehicle 300.

When there is no electrical current detected, according to one embodiment, vehicle 300 may transition from the manual driving mode back to the autonomous driving mode. That is, when driver 311 lifts his/her hands from steering wheel 301, it can interpreted that driver 311 intends to give up the control of vehicle 300. Similarly, to reduce the possibility of false alarms, vehicle 300 may transition from the manual mode to autonomous mode after a predetermined period of time during which no electrical current is detected. Alternatively, the detection of no electrical current in combination of one or more other user actions (e.g., lifting a foot from a brake pedal and/or an acceleration or gas pedal) may be used to confirm the driver's intent to release the control of vehicle 300.

Figure 4:
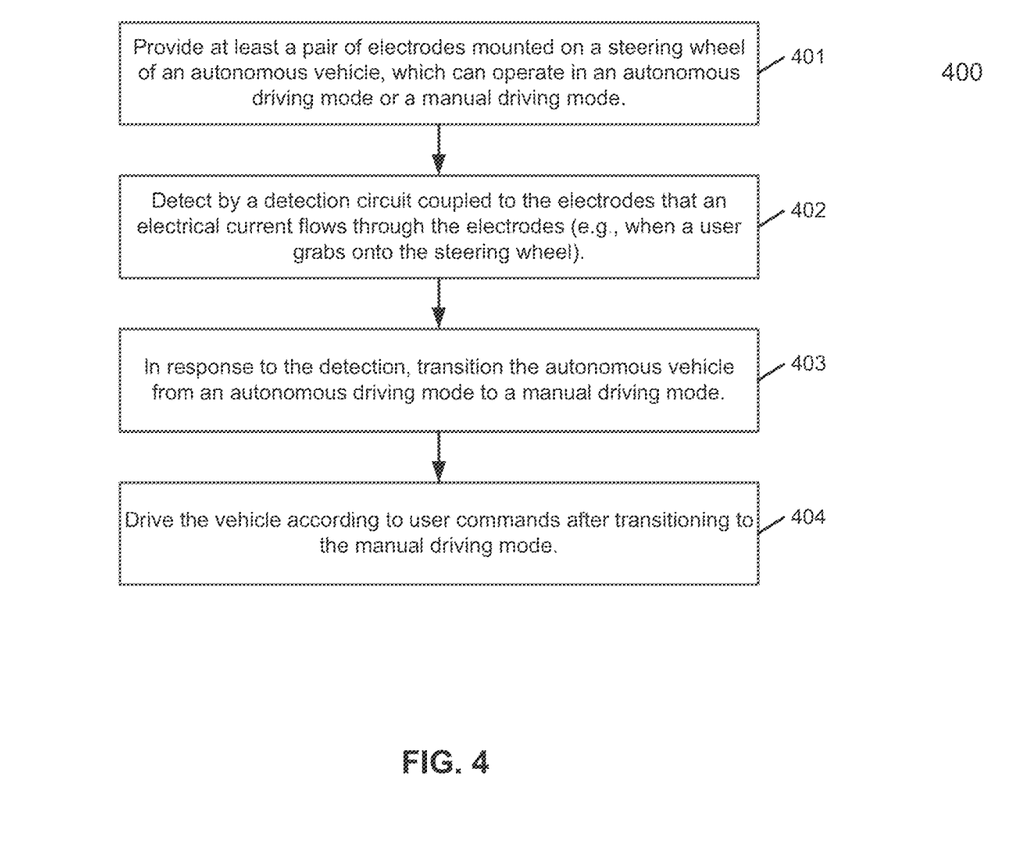
FIG. 4 is a flow diagram illustrating a process of operating an autonomous vehicle according to one embodiment of the invention.

FIG. 4 is a flow diagram illustrating a process of operating an autonomous vehicle according to one embodiment of the invention. Process 400 may be performed by processing logic which may include software, hardware, or a combination thereof. For example, process 400 may be performed by system 300 of FIG. 3. Referring to FIG. 4, at block 401, at least a pair of electrodes are mounted on at least two locations of a steering wheel of an autonomous vehicle. At block 402, it is detected that an electrical current flows through the electrodes (e.g., a body part of a human driver contacts the electrodes). In response to the detection of electrical current, at block 403, the vehicle is transitioned from an autonomous driving mode to a manual driving mode. At block 404, the vehicle is driven manually in response to driver's actions.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
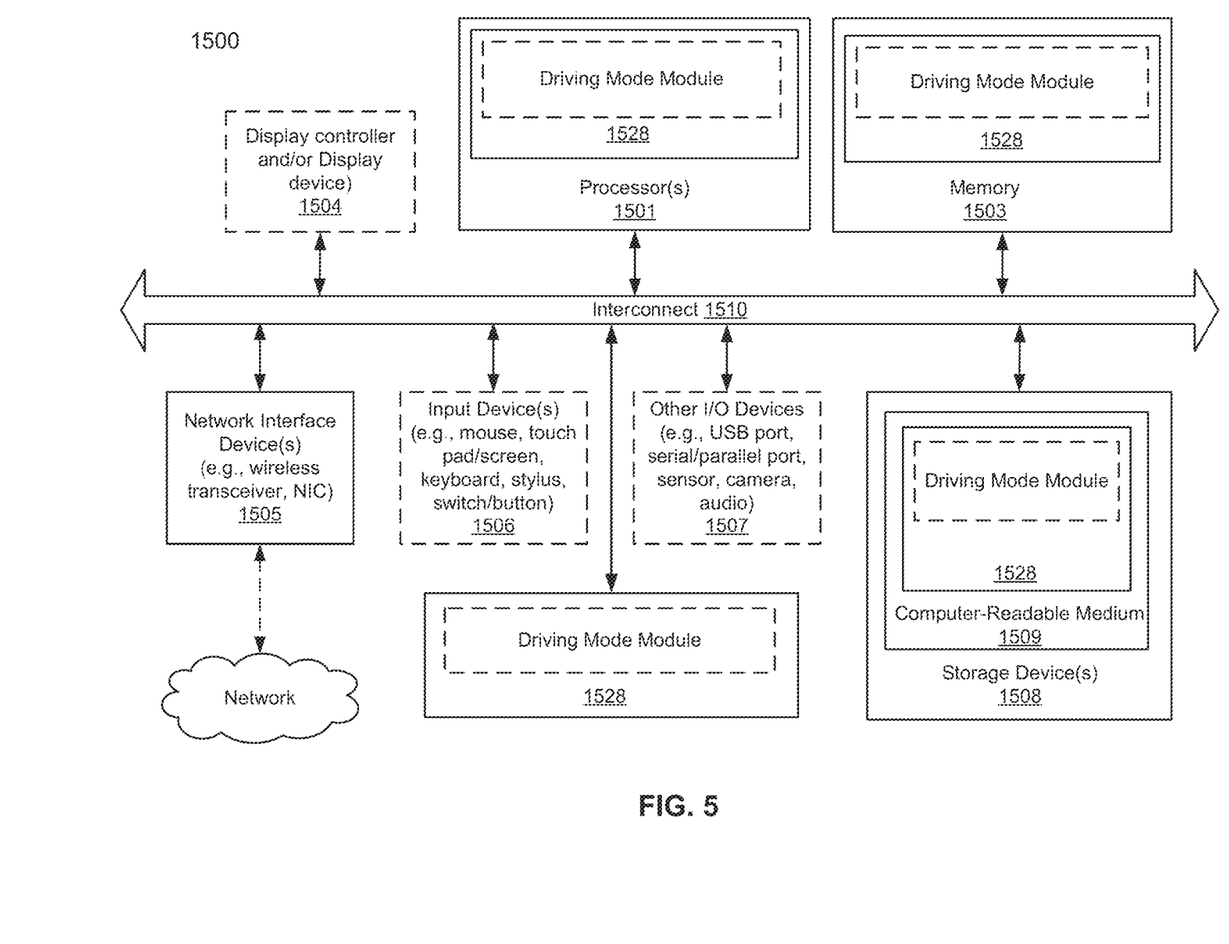
FIG. 5 is a block diagram illustrating a data processing system according to one embodiment.

FIG. 5 is a block diagram illustrating an example of a data processing system which may be used with one embodiment of the invention. For example, system 1500 may represents any of data processing systems described above performing any of the processes or methods described above, such as, for example, data processing system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor

1501, e.g., via a serial peripheral interface (SPI). This flash device may provide for non-volatile storage of system software, including a BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous vehicle, the method comprising:
    operating an autonomous vehicle in an autonomous mode, wherein during the autonomous mode, the autonomous vehicle operates without influence of a human driver riding in the autonomous vehicle;
    detecting an electrical current flowing from a first electrode to a second electrode mounted on a steering wheel of the autonomous vehicle, wherein the first electrode is disposed on a first half of the steering wheel and significantly over a surface of the first half of the steering wheel, and wherein the second electrode is disposed on a second half of the steering wheel and significantly over a surface of the second half of the steering wheel;
    detecting that the electrical current has been flowing from the first electrode to the second electrode for a predetermined of time;
    in response to the detecting the electrical current flowing from the first electrode to the second electrode for the predetermined period of time, transitioning the autonomous vehicle from the autonomous mode to a manual mode; and
    operating the autonomous vehicle in the manual mode in response to user actions from the human driver.

2. The method of claim 1, wherein the first electrode is mounted on a first location of the steering wheel and the second electrode is mounted on a second location of the steering wheel without physical contact.

3. The method of claim 2, wherein the first electrode is mounted on a left half of a perimeter of the steering wheel and the second electrode is mounted on a right second half of the perimeter of the steering wheel.

4. The method of claim 2, wherein the electrical current is generated when a first body part of the human driver contacts the first electrode and a second body part of the human driver contacts the second electrode.

5. The method of claim 4, wherein the electrical current is generated due to the electrical current flowing through a human body of the human driver when the human driver contacts the first electrode and the second electrode.

6. The method of claim 4, wherein the electrical current is generated when human driver grabs the steering wheel by hands thereby contacting the first electrode and the second electrode mounted on the steering wheel.

7. The method of claim 1, further comprising:
    detecting that the electrical current has stopped flowing through the first electrode and the second electrode while the autonomous vehicle is operating in the manual mode; and
    in response to detecting that the electrical current has stopped flowing from the first electrode, to the second electrode, transitioning the autonomous vehicle back to the autonomous mode.

8. A non-transitory machine-readable medium having instructions stored therein, which when executed by a processor, cause the processor to perform operations of operating an autonomous vehicle, the operations including
    operating an autonomous vehicle in an autonomous mode, wherein during the autonomous mode, the autonomous vehicle operates without influence of a human driver riding in the autonomous vehicle;
    detecting an electrical current flowing from a first electrode to a second electrode mounted on a steering wheel of the autonomous vehicle, wherein the first electrode is disposed on a first half of the steering wheel and significantly over a surface of the first half of the steering wheel, and wherein the second electrode is disposed on a second half of the steering wheel and significantly over a surface of the second half of the steering wheel;
    detecting that the electrical current has been flowing from the first electrode to the second electrode for a predetermined of time;
    in response to the detecting the electrical current flowing from the first electrode to the second electrode for the predetermined period of time, transitioning the autonomous vehicle from the autonomous mode to a manual mode; and
    operating the autonomous vehicle in the manual mode in response to user actions from the human driver.

9. The machine-readable medium of claim 8, wherein the first electrode is mounted on a first location of the steering wheel and the second electrode is mounted on a second location of the steering wheel without physical contact.

10. The machine-readable medium of claim 9, wherein the first electrode is mounted on a left half of a perimeter of the steering wheel and the second electrode is mounted on a right half of the perimeter of the steering wheel.

11. The machine-readable medium of claim 9, wherein the electrical current is generated when a first body part of the human driver contacts the first electrode and a second body part of the human driver contacts the second electrode.

12. The machine-readable medium of claim 11, wherein the electrical current is generated due to the electrical current flowing through a human body of the human driver when the human driver contacts the first electrode and the second electrode.

13. The machine-readable medium of claim 11, wherein the electrical current is generated when human driver grabs the steering wheel by hands thereby contacting the first electrode and the second electrode mounted on the steering wheel.

14. The machine-readable medium of claim 8, further comprising:
   detecting that the electrical current has stopped flowing through the first electrode and the second electrode while the autonomous vehicle is operating in the manual mode; and
   in response to detecting that the electrical current has stopped flowing from the first electrode to the second electrode, transitioning the autonomous vehicle back to the autonomous mode.

15. A data processing system, comprising:
   a processor; and
   a memory coupled to the processor for storing instructions, which when executed by the processor, cause the processor to perform operations of operating an autonomous vehicle, the operations including
   operating an autonomous vehicle in an autonomous mode, wherein during the autonomous mode, the autonomous vehicle operates without influence of a human driver riding in the autonomous vehicle;
   detecting an electrical current flowing from a first electrode to a second electrode mounted on a steering wheel of the autonomous vehicle, wherein the first electrode is disposed on a first half of the steering wheel and significantly over a surface of the first half of the steering wheel, and wherein the second electrode is disposed on a second half of the steering wheel and significantly over a surface of the second half of the steering wheel;
   detecting that the electrical current has been flowing from the first electrode to the second electrode for a predetermined of time;
   in response to the detecting the electrical current flowing from the first electrode to the second electrode for the predetermined period of time, transitioning the autonomous vehicle from the autonomous mode to a manual mode; and
   operating the autonomous vehicle in the manual mode in response to user actions from the human driver.

16. The system of claim 15, wherein the first electrode is mounted on a first location of the steering wheel and the second electrode is mounted on a second location of the steering wheel without physical contact.

17. The system of claim 16, wherein the first electrode is mounted on a left half of a perimeter of the steering wheel and the second electrode is mounted on a right half of the perimeter of the steering wheel.

18. The system of claim 16, wherein the electrical current is generated when a first body part of the human driver contacts the first electrode and a second body part of the human driver contacts the second electrode.

19. The system of claim 18, wherein the electrical current is generated due to the electrical current flowing through a human body of the human driver when the human driver contacts the first electrode and the second electrode.

20. The system of claim 18, wherein the electrical current is generated when human driver grabs the steering wheel by hands thereby contacting the first electrode and the second electrode mounted on the steering wheel.

21. The system of claim 15, wherein the operations further comprise:
   detecting that the electrical current has stopped flowing from the first electrode to the second electrode while the autonomous vehicle is operating in the manual mode; and
   in response to detecting that the electrical current has stopped flowing through the first electrode and the second electrode, transitioning the autonomous vehicle back to the autonomous mode.

* * * * *